Feb. 25, 1941.    E. C. BRISBANE    2,232,901
VALVE
Filed June 23, 1939    5 Sheets-Sheet 1

Fig 1

Inventor
EUGENE C. BRISBANE
By
Malcolm P. Gannett
Attorney

Feb. 25, 1941.  E. C. BRISBANE  2,232,901
VALVE
Filed June 23, 1939  5 Sheets-Sheet 2

Fig. 2

Inventor
EUGENE C. BRISBANE
By
Malcolm F. Gannett
Attorney

Feb. 25, 1941.  E. C. BRISBANE  2,232,901
VALVE
Filed June 23, 1939   5 Sheets-Sheet 3

Fig. 3

Inventor
EUGENE C. BRISBANE
By
Malcolm F. Gannett
Attorney

Feb. 25, 1941.  E. C. BRISBANE  2,232,901
VALVE
Filed June 23, 1939   5 Sheets-Sheet 4

Fig. 4

Inventor
EUGENE C. BRISBANE
By Malcolm F. Gannett
Attorney

Feb. 25, 1941.　　　　E. C. BRISBANE　　　　2,232,901
VALVE
Filed June 23, 1939　　　　5 Sheets-Sheet 5

Fig. 5

Inventor
EUGENE C. BRISBANE
By Malcolm F. Gannett
Attorney

UNITED STATES PATENT OFFICE 2,232,901

VALVE

Eugene C. Brisbane, York, Pa., assignor to S. Morgan Smith Company, York, Pa., a corporation of Pennsylvania Application June 23, 1939, Serial No. 280,690

44 Claims. (Cl. 103—40)

This invention relates to valves and more particularly to valves of the automatically operable type which are commonly installed in pipe lines or conduits on the discharge side of a pump or other means which delivers fluid under pressure to the pipe line, for the purpose of shutting off communication through the pipe when the pump is shut down or ceases to function, in order to prevent back flow of fluid to the pump.

An object of the invention is to provide an improved control system for automatically operable valves in which the valve operating mechanism functions to effect closing of the valve at a predetermined rate under normal conditions, and in which, under emergency conditions, the closing of the valve is effected at a rapid rate.

The invention is particularly applicable for use with automatic conical plug valves of the type shown in my Patent No. 2,078,231, granted April 27, 1937.

Briefly described, the improved valve control system of the present invention comprises a pump operated by an electric motor, a fluid pressure operated plug valve which is installed in the pipe line on the discharge side of the pump, control mechanism for the valve, electric circuits interconnected with the pump motor and the valve control mechanism for automatically controlling the position of the valve plug according to normal operating conditions of the pump, and auxiliary electric circuits for effecting operation of the valve control mechanism under emergency conditions. The control mechanism under normal conditions functions to effect opening or closing of the valve at a substantially uniform rate, the total time of operation of the valve from fully closed to fully open position or vice versa being approximately forty seconds. When an emergency condition arises, such as failure of electric power supply to the main pump motor, an auxiliary emergency trip switch is adapted to be actuated so as to effect operation of an auxiliary control mechanism which is adapted to effect closing of the valve at a rapid rate. The rate of the main valve closing movement under the auxiliary control is such that the total time of operation from the fully opened position to an angular position of the plug halfway between open position and cut-off position is approximately four seconds. The cut-off position of the valve plug is the angular position at which the waterway opening through the plug at the smaller diameter end no longer overlaps any portion of the corresponding circular opening through the valve body. The rate of closing during the latter part of the rapid emergency closing movement of the plug is retarded sufficiently so as to prevent injury to the valve or jamming of the plug in closed position.

Other objects and advantages of this invention will be more apparent from the following detailed description of certain approved forms of apparatus constructed and operating according to the principles of this invention.

From a suitable source of supply, the motor driven pump 11 is adapted to deliver fluid to a pipe line 12.

At the discharge side of the pump 11, there is installed a valve 13 for the purpose of controlling communication through the pipe line 12.

The valve 13 has a rotatable plug 14 with a waterway 15 formed therein.

The plug 14 is adapted to be rotated by suitable mechanism. In the present instance, the plug operating mechanism is shown as comprising a sector 16 which is fixed to one end of the stem of the valve plug 14 and has teeth in meshing relationship with the teeth of a rack bar 17.

One end of the rack bar 17 is connected to an end of the rod 18 of a piston 19 mounted in a cylinder 20.

Reciprocation of the piston 19 within the cylinder 20 is adapted to turn the plug 14 through an angle of approximately 90° so as to position the waterway 15 of the plug 14, whereby the flow of fluid through the pipe line 12 is either cut off or permitted.

For the purpose of controlling the operation of the piston 19, a suitable control valve device 21 is employed.

The control valve 21 in turn is under the control of a pilot valve 22.

Figure 2:
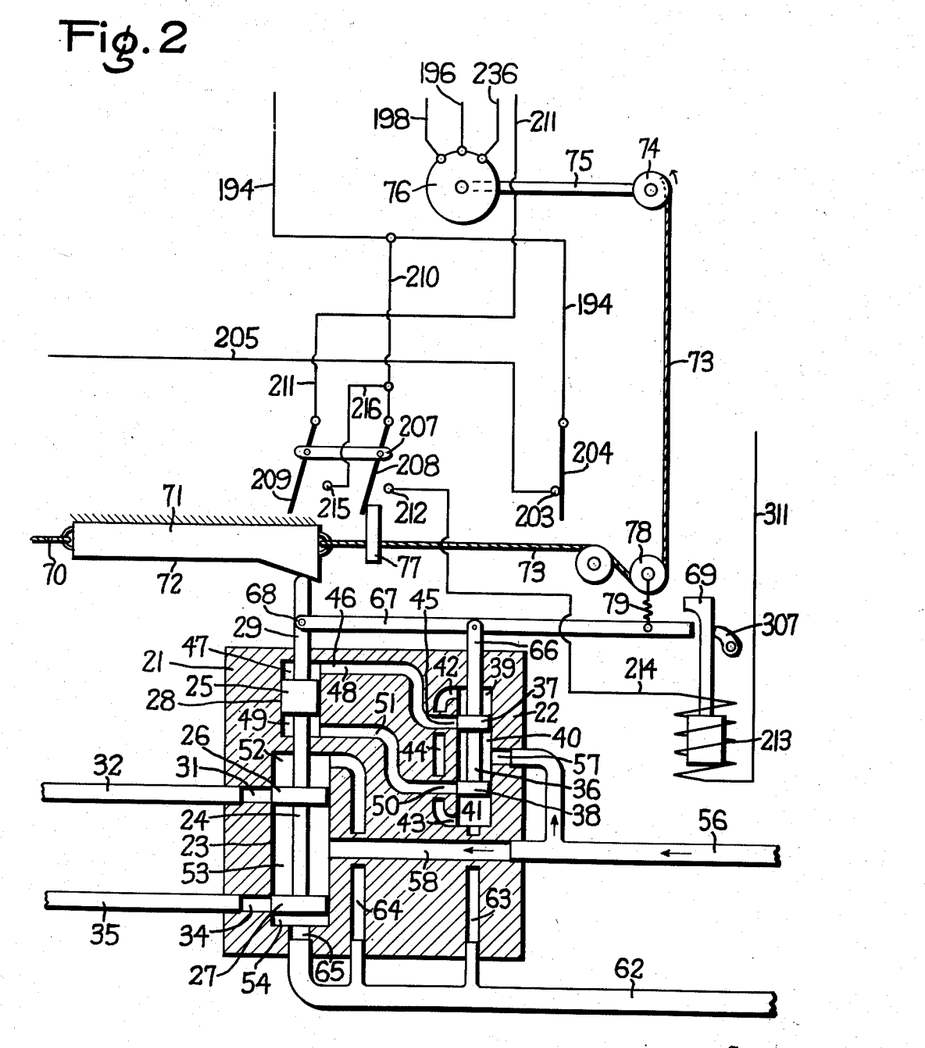
Figs. 2, 3, 4 and 5 are enlarged views of the wiring diagrams and associated parts shown in Fig. 1.

As shown in Fig. 2, the control valve device 21 comprises a casing formed with a cylindrical bore 23, in which is mounted the plunger 24 of a piston valve, said plunger having a pair of spaced heads 26 and 27, and the piston valve having a piston 25 mounted in a bore 28. The piston valve has a stem 29 which extends through the casing of the control valve device 21 for a purpose to be hereinafter more fully described.

The piston chamber 30 is connected to a port 31 of the control valve 21 by a pipe 32, and the piston chamber 33 on the other side of the piston 19 is connected to a port 34 of the control valve 21 by a pipe 35.

Normally the piston valve heads 26 and 27 lap the ports 31 and 34, respectively, thereby cutting off the supply of fluid under pressure to cylinder 20, so that the piston 19 will be retained in a predetermined position.

The pilot valve device 22 comprises a plunger 36 having a pair of spaced heads 37 and 38, said plunger being mounted in a cylindrical bore which is divided by the heads 37 and 38 into three chambers 39, 40 and 41.

The chambers 39 and 41 are connected by ports 42 and 43 and a passage 44.

The port 45 of the pilot valve 22 is connected to a port 46 of the piston chamber 47 of the control valve 21 by a passage 48.

The chamber 49 on the other side of the piston 25 is connected to pilot valve port 50 by a passage 51.

Normally the heads 37 and 38 of the pilot valve 22 lap the ports 45 and 50, as shown in Fig. 2.

The heads 26 and 27 divide the bore 23 into a plurality of chambers 52, 53 and 54.

The chambers 40 and 53 are both connected to a supply of fluid under pressure, such as a tank 55, by a pipe 56 and passages 57 and 58, which connect said pipe with said chambers, respectively.

Figure 1:
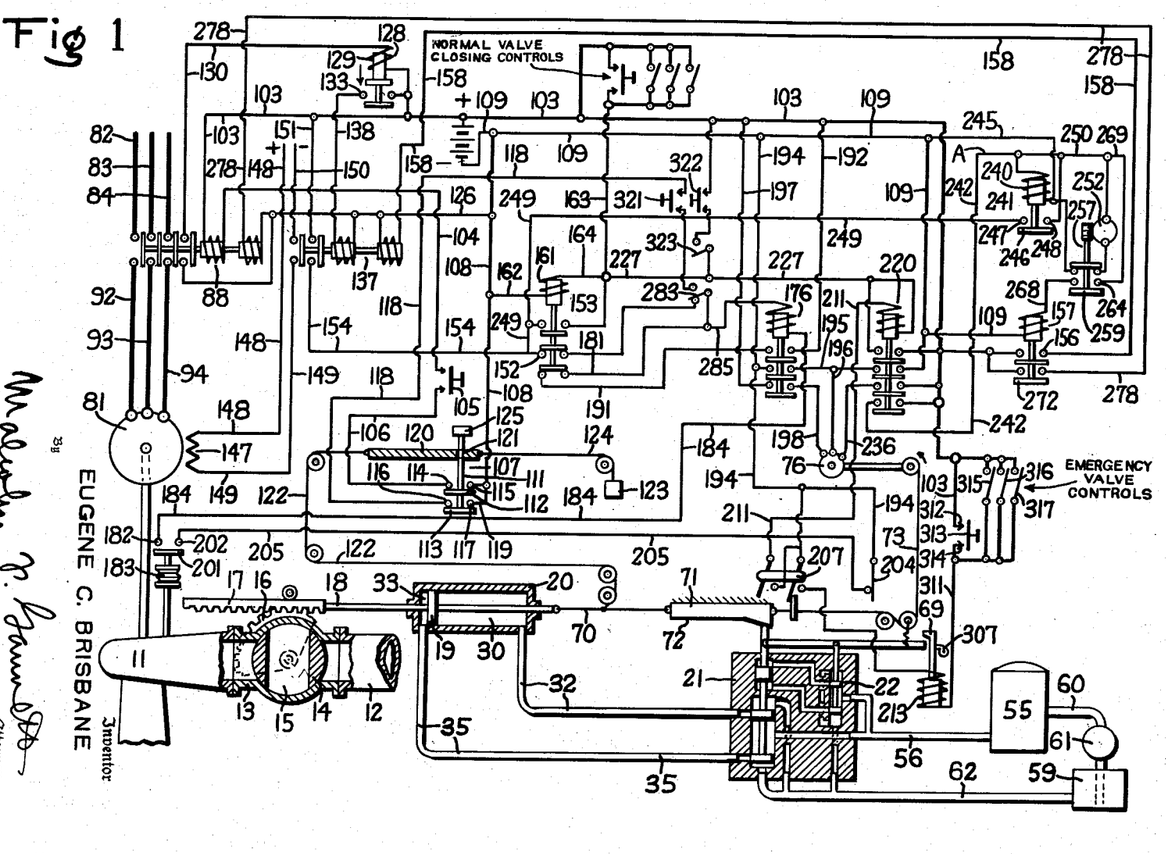
Figure 1 is a diagrammatic view, partly in section, of a valve control system embodying the present invention.

A sump tank 59 is adapted to receive surplus fluid from the apparatus, and in order that the fluid can be returned to the pressure tank 55, the sump tank 59 is connected to the pressure tank by a pipe 60, a pump 61 being operatively connected to said pipe, as shown in Fig. 1, for withdrawing fluid from the sump tank 59 and delivering fluid to the tank 55 under predetermined pressure.

The chambers 39, 41, 52 and 54, are respectively connected to a pipe 62 leading to the sump tank 59, by passages 63, 64 and 65.

The plunger 36 of the pilot valve 22 has a stem 66 which extends through the casing of said valve device and is connected to the intermediate portion of a floating lever 67.

One end of the floating lever 67 is pivotally connected to the stem 29 of the control valve plunger 24, as indicated at 68, Fig. 2.

The other end of the floating lever 67 extends outwardly beyond the stem 66 a suitable distance so as to be operatively associated with an actuating member 69.

The piston rod 18 extends through the cylinder 20 and has connected thereto one end of a cable 70.

The other end of the cable 70 is connected to an end of a reciprocable member 71 having a cam surface 72 adapted to be engaged by the upper end of the stem 29 of the plunger 24 during operation of the apparatus as will be hereinafter more fully described.

The other end of the cam member 71 is connected by a cable 73 to a drum 74 fixed to the shaft 75 of an electric motor 76.

The cable 73 carries an arm 77 for a purpose to be hereinafter more fully described.

The cable 73, at a convenient point between the cam member 71 and the drum 74 passes around a pulley 78 which is connected to the free end portion of the floating lever 67 by resilient means, such as a spring 79.

Figure 5:
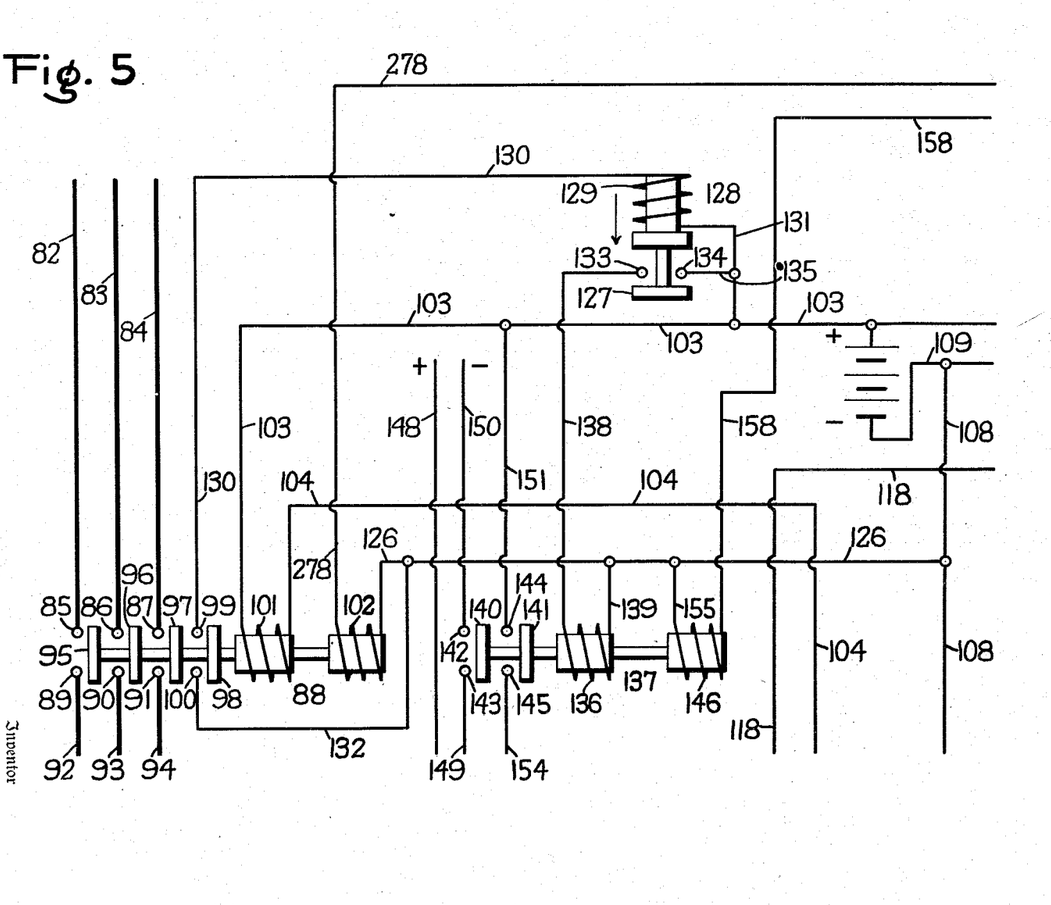

Referring to Figs. 1 and 5, the pump 11 is driven by a synchronous motor 81.

The main line conductors 82, 83 and 84 supply three-phase electric energy from a suitable source of supply to the fixed contacts 85, 86 and 87 of a main pump motor switch mechanism 88. Other fixed contacts 89, 90 and 91 of this switch mechanism are connected to the terminals of the motor 81, by conductors 92, 93 and 94, respectively.

The motor switch mechanism 88 comprises movable contacts 95, 96 and 97 adapted to connect contacts 85, 86 and 87 with contacts 89, 90 and 91, respectively, and also a movable contact 98 adapted to connect the fixed contacts 99 and 100 of another electric circuit to be hereinafter referred to.

The movable contacts of the switch mechanism 88 are adapted to be actuated by either of two solenoid coils 101 and 102.

The coil 101, which is termed the closing coil, is energized through a circuit extending from positive main 103, through coil 101, wire 104, push button switch 105, wire 106, interlock switch device 107, and wire 108 to the negative main 109.

The push button switch 105 is normally open, as shown in Fig. 1 and is adapted to be actuated to close the circuit by connecting wires 104 and 106 when the pump 11 is to be started.

The interlock switch device 107 comprises a manually operable stem 111 carrying a pair of movable contacts 112 and 113. The contact 112 connects the fixed contacts 114 and 115 to which the wires 106 and 108 are connected, respectively. The contact 113 connects the fixed contacts 116 and 117 to which the wires 118 and 119, respectively, are connected.

A bar 120 having an opening 121 therein is slidably mounted in any suitable manner. One end of the bar 120 is connected to the cable 70 heretofore referred to, by a cable 122. Means, such as a weight 123 connected to the other end of the bar 120, by a cable 124, act to keep the bar correctly positioned and the cable 122 taut.

An actuator 125, normally positioned above the bar, has a stem adapted to be moved downwardly through the opening 121 and engage the stem 111 for the purpose of disconnecting the movable contacts 112 and 113 from the respective fixed contacts, when it is desired to open the motor circuit. However, under normal operating conditions the interlock switch device 107 is in the closed position show in Fig. 1.

The coil 102, which is termed the tripping coil, is energized through a circuit including the positive main 103 and the negative main 108, 109, in the manner to be hereinafter referred to. One terminal of the coil 102 is connected to the negative main 108, by a wire 126, as shown in Fig. 5.

The movable contact 127 of the time delayed relay switch mechanism 128 is adapted to be actuated by a time delayed solenoid coil 129.

One terminal of the coil 129 is connected to the fixed contact 99, by a wire 130, and the other terminal of said coil is connected to the positive main 103 by a wire 131. The negative main 109 is connected to the fixed terminal 100 by wires 108, 126 and 132.

When the coil 129 is energized, the movable contact 127 connects the fixed contacts 133 and 134.

The contact 134 is connected to the wire 131 by a wire 135.

The contact 133 is connected to one terminal of a coil 136 of a motor field switch mechanism 137, by a wire 138. The other terminal of the coil 136 is connected to the wire 126, by a wire 139.

The motor field switch mechanism 137 comprises movable contacts 140 and 141, the contact 140 being adapted to connect the fixed contacts 142 and 143, and the contact 141 being adapted to connect the fixed contacts 144 and 145.

The movable contacts 140 and 141 are adapted to be actuated by either the solenoid coil 136, or a solenoid coil 146.

One terminal of the motor field 147 is connected to a positive main 148, and the other terminal of said motor field is connected to the fixed contact 143 by a wire 149. The fixed contact 142 is connected to a negative main 150 (see Figs. 1 and 5).

Figure 4:
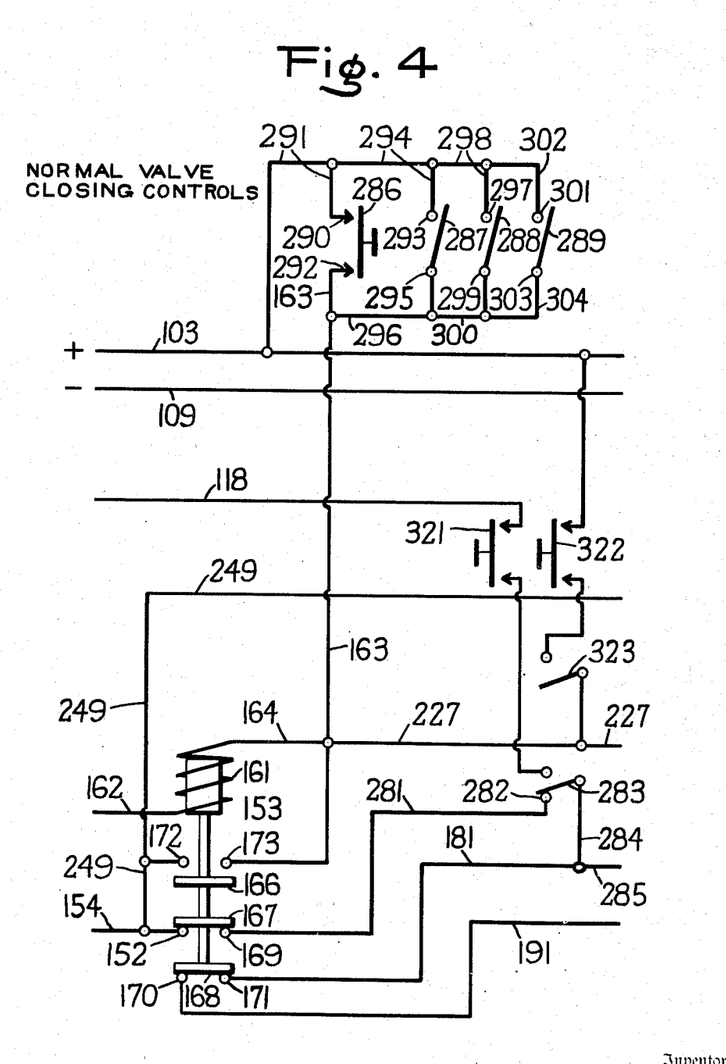

The fixed contact 144 is connected to the positive main 103 by a wire 151, and the fixed contact 145 is connected to the fixed contact 152 of an auxiliary relay switch mechanism 153, by a wire 154, (see Figs. 1 and 4).

One terminal of the solenoid coil 146 of the motor field switch mechanism 137 is connected to the negative main 109, by wires 155, 126 and 108, and the other terminal of coil 146 is connected to a fixed contact 156 of a tripping coil contactor switch mechanism 157, by a wire 158.

The relay controlled switch mechanism 153 comprises a solenoid coil 161, one terminal of which is connected to the negative main 109, by wires 162 and 108, and the other terminal of which coil is connected to a wire 163, by a wire 164 (see Figs. 1 and 4).

The coil 161 actuates movable contacts 166, 167 and 168. When the solenoid is deenergized its core will be down so that the movable contact 167 connects the pair of fixed contacts 152 and 169, and the movable contact will also connect the pair of fixed contacts 170 and 171. The movable contact 166 will be disengaged from the pair of fixed contacts 172 and 173.

Figure 3:
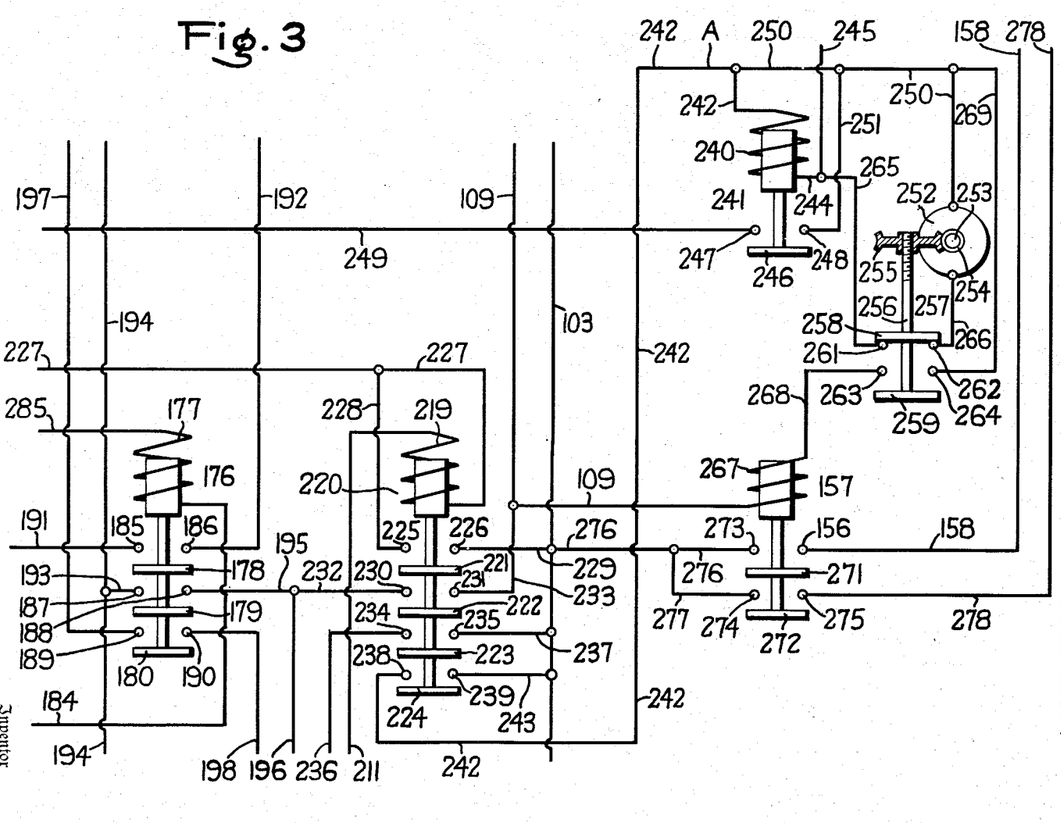

As shown in Figs. 1 and 3, the opening motor contactor comprises a relay controlled switch mechanism 176, having a solenoid coil 177 for actuating a plurality of movable contacts 178, 179 and 180.

One terminal of the coil 177 is connected to the fixed contact 171 of the switch mechanism 153, by wires 285 and 181.

The other terminal of the coil 177 is connected to a fixed contact 182 of a pressure switch interlock device 183, by a wire 184.

When the solenoid 177 is energized the movable contacts 178, 179 and 180 connect the pairs of fixed contacts 185, 186 and 187, 188 and 189, 190, respectively. The solenoid 177 is shown in deenergized position in Fig. 3.

The fixed contact 185 is connected to the fixed contact 170, by a wire 191.

The fixed contact 186 is connected to the positive main 103, by a wire 192.

The fixed contact 187 is connected to the negative main 109, by wires 193 and 194.

The fixed contact 188 is connected to one terminal of the motor 76, by wires 195 and 196.

The fixed contact 189 is connected to the positive main 103, by a wire 197.

The fixed contact 190 is connected to a terminal of the motor 76, by a wire 198 (see Figs. 1, 2 and 3).

The pressure switch interlock device 183 is, as shown in Fig. 1, connected to the pressure side of the pump 11, between said pump and the valve 13, so that fluid pressure can be used for operating the movable contact 201 of said device. When the pump 11 is inactive the movable contact 201 will be disengaged from the fixed contacts 182 and 202. When the pump 11 is started, the valve 13 will be closed. Therefore, as pressure is built up in the section of the conduit between the pump 11 and the valve 13, such pressure will actuate the pressure switch interlock device 183 and the movable contact 201 will be engaged with the fixed contacts 182 and 202.

The fixed contact 202 is connected to a fixed contact 203 of a limit switch device 204, by a wire 205 (see Figs. 1 and 2).

The movable arm of the limit switch 204 is connected to the negative main 109, by the wire 194.

Associated with the limit switch 204, is another limit switch 207 comprising a pair of connected switch arms 208 and 209.

The switch arm 208 is connected to the wire 194, by a wire 210, and the switch arm 209 is connected to one terminal of the coil 219 of the relay controlled switch mechanism 220, by a wire 211 (see Figs. 1, 2 and 3).

During the operation of the device the switch arm 208 is adapted to engage a fixed contact 212, which is connected to one terminal of the coil 213 of a solenoid associated with the actuating member 69, by a wire 214. The switch arm 209 at the same time is adapted to engage a fixed contact 215, which is connected to the wire 210, by a wire 216, as shown in Fig. 2.

The limit switches 204 and 207 are actuated by the arm 77.

The switch mechanism 220 comprises a plurality of movable contacts 221, 222, 223 and 224 adapted to be operated by the relay 219 (see Fig. 3).

The movable contact 221 is adapted to engage the fixed contacts 225 and 226. The contact 225 is connected to the wire 227 which connects a terminal of the coil 219 with the wire 163, by a wire 228, and the contact 226 is connected to the positive main 103, by wire 229.

The movable contact 222 is adapted to engage the fixed contacts 230 and 231. The contact 230 is connected to the wire 196, by a wire 232, and the contact 231 is connected to the negative main 109, by a wire 233.

The movable contact 223 is adapted to engage the fixed contacts 234 and 235. The contact 234 is connected to a terminal of the motor 76, by a wire 236. The contact 235 is connected to the positive main 103, by a wire 237.

The movable contact 224 is adapted to engage the fixed contacts 238 and 239. The contact 238 is connected to one terminal of the solenoid coil 240 of a timing relay 241, by a wire 242. The contact 239 is connected to the positive main 103 by a wire 243.

The other terminal of the solenoid coil 240 is connected to the negative main 109, by wires 244 and 245.

Operated by the coil 240 is a switch comprising a movable contact 246 and a pair of fixed contacts 247 and 248, adapted to be connected by the movable contact 246 when the coil 240 is energized.

The fixed contact 247 is connected to the wire 154, by a wire 249 (see Figs. 1, 3 and 4), and the fixed contact 248 is connected to a wire 250, by a wire 251.

One end of the wire 250 is connected to the wire 242, and the other end of the wire 250 is connected to a terminal of a timing motor 252.

The shaft 253 of the motor 252 has fixed thereto a gear 254 which is in meshing relationship with a gear 255 having threaded connection with the stem 256 of a switch device 257. The stem 256 carries a pair of contacts 258 and 259, which are moved by said stem when the motor 252 operates.

In one extreme position of the switch 257, the movable contact 258 connects the pair of fixed contacts 261 and 262 and the movable contact 259 is disengaged from the pair of fixed contacts 263 and 264, and in the other extreme position of the switch 257 the reverse takes place; namely, the movable contact 258 is disengaged from the fixed contacts 261 and 262, and the movable contact 259 connects the fixed contacts 263 and 264.

The fixed contact 261 is connected to the wire 245, by a wire 265, and the fixed contact 262 is connected to a terminal of the motor 252 by a wire 266.

The fixed contact 263 is connected to one terminal of the solenoid coil 267 of the tripping coil contact switch mechanism 157, by a wire 268. The other terminal of the coil 267 is connected to the negative main 109, as shown in Fig. 3.

The fixed contact 264 is connected to the wire 250, by a wire 269.

The solenoid coil 267 of the switch mechanism 157, is adapted to operate a pair of movable contacts 271 and 272.

The movable contact 271 is adapted to engage the pair of fixed contacts 156 and 273, and the movable contact 272 is adapted to engage the pair of fixed contacts 274 and 275.

The fixed contact 273 is connected to the positive main 103 by a wire 276.

The fixed contact 274 is also connected to the positive main 103 by wires 277 and 276.

The fixed contact 275 is connected to a terminal of the solenoid coil 102, by a wire 278.

When it is desired to start the motor 81 of the pump 11, the manually controlled push button switch 105 is operated. This closes the circuit by which the solenoid coil 101 is energized, from the positive main 103, through the coil 101, wire 104, switch 105, wire 106, contacts 114, 112 and 115 of the interlock switch device 107, wire 108, and the negative main 109.

When the solenoid coil 101 is energized, the main switch mechanism 88 will be operated and the movable contacts 95, 96, 97 and 98 will engage the pairs of fixed contacts 85, 89 and 86, 90 and 87, 91 and 99, 100, respectively. Three phase electric energy will then be supplied to the pump motor 81 from the main conductors 82, 83 and 84, through the main conductors 92, 93 and 94, respectively.

Since the movable contact 98 engages the fixed contacts 99 and 100 when the coil 101 is energized, the coil 129 of the time delayed relay switch 128 will also be energized. After a predetermined time interval, during which the main pump motor 81 approaches synchronous speed, the movable contact 127 engages the fixed contacts 133 and 134. An electric circuit is then closed by which the closing coil 136 of the motor field switch mechanism 137 is energized, from the positive main 103, through wires 131, 135, contacts 134, 127 and 133, wire 138, coil 136, wires 139, 126 and 108, and the negative main 109 (see Fig. 5).

When the solenoid coil 136 is energized the motor field switch 137 is closed, thereby supplying electric energy to the motor field 147, from the positive main 148, through the coil 147, wire 149, contacts 143, 140 and 142, and negative main 150.

After the pump 11 is initially started, and before the valve plug 15 opens, the pressure switch device 183 is operated by the increase in pressure of the fluid in the pipe line on the pressure side of the pump 11, so that the movable contact 201 engages the fixed contacts 182 and 202.

At the same time the electric circuit is closed through the contacts 144, 141 and 145 of the switch 137, by which the coil 177 of the motor switch mechanism 176 is energized. Said coil 177 is energized from the positive main 103, through wire 151, contacts 144, 141 and 145, wire 154, contacts 152, 167 and 169, of the auxiliary relay switch mechanism 153, wire 281, contact 282, switch 283, wires 284, 285, coil 177, wire 184, contacts 182, 201 and 202, wire 205, limit switch 204, wire 194, and negative main 109.

When the coil 177 is energized the movable contacts 178, 179 and 180 will be moved upwardly into engagement with the pairs of fixed contacts 185, 186 and 187, 188 and 189, 190, respectively, thereby closing an electric circuit of the reversing motor 76, from the positive main 103, through wire 197, contacts 189, 180 and 190, wire 198 to one terminal of the motor 76, and from another terminal of said motor through wires 196, 195, contacts 188, 179 and 187, and wires 193 and 194, to the negative main 109.

When the motor 76 is thus operated, the drum 74 will be rotated in the direction of the arrow, Fig. 2, and the cable 73 wound up on the drum.

As the cable 73 is drawn upwardly and wound around the drum 74, the pulley 78 will be lifted, and, through the medium of the spring 79, the lever 67 will be moved upwardly about the fulcrum provided by the pivot 68.

In the upward swinging movement of the lever 67, the plunger 36 of the pilot valve device 22 is pulled upward an amount sufficient so that the head 37 uncovers the port 45, thereby connecting the pressure chamber 40 with the chamber 47 of the control valve 21, through passage 48.

Fluid under pressure from the supply tank 55 will thus be supplied to the chamber 47. At the same time the chamber 49 on the underside of the piston 25 will be connected to the sump tank 59, through passage 51, chamber 41, passage 63, and pipe 62.

In this way the piston 25 will be forced downwardly by the fluid under pressure thus supplied to chamber 47, and consequently the plunger 24 will move downwardly so that the heads 26 and 27 uncover the ports 31 and 34.

When the port 31 is uncovered, the piston chamber 30 will be connected to the sump tank 59, through pipe 32, chamber 52, passage 64 and pipe 62.

Fluid under pressure will, at the same time, be supplied to the piston chamber 33 from the pressure tank 55, through pipe 56, passage 58, chamber 53, port 34, and pipe 35.

In this way the piston 19 is actuated to operate the valve plug mechanism and effect rotation of the plug 14 from closed towards open position.

As the piston 19 (Fig. 1) moves towards the right, the slack in the cables 70 and 73 is taken up, since the cable 73 is being wound around the drum 74. The weight 123 will, at the same time, pull the bar 120 of the interlock switch device 107, towards the right, thereby moving the opening 121 out of registration with the stem of the actuator 125.

Since the lever 67 functions as a floating lever, the fulcrum provided by the pivot 68 is not fixed, and this fulcrum moves downwardly when the control valve plunger 24 is moved downwardly in the manner above described. The cam member 71 also moves towards the right from the position shown in Figs. 1 and 2, and since the tautness of the cable 73 is reduced by the movement to the right of the piston 19, the end portion of the lever 67, to which the spring 79 is attached will also move downward gradually, and consequently the plunger 36 of the pilot valve 22 will be lowered. In this way the supply of fluid under pressure to the piston chamber 33 will be controlled in such a manner that the valve plug 14 will not be rotated towards open position any faster than the speed at which the reversing motor 76 permits operation to take place.

During the movement of the piston 19 from valve closed towards valve open position, the arm 77 is carried by the cable 73 from the position shown in Fig. 2 towards the right.

When the valve plug 14 has thus been rotated to its wide open position, the arm 77 engages the depending end of the limit switch 204 and moves said switch towards the right an amount sufficient to disengage the switch 204 from the contact 203. In this way the electric circuit of the motor 76 will be opened, so that no further operation of said motor takes place. The relative positions of the plungers 24 and 36 of the control valve 21 and the pilot valve 22, respectively, will at this stage of the operation of the apparatus be the same as shown in Fig. 2, and consequently with the ports 31, 34, 45 and 50 lapped, the fluid under pressure supplied to piston chamber 33 will be bottled up and the piston 19 will be retained in valve open position.

The valve 13 can be closed by two methods, one of which is adapted to operate under normal conditions, and the other method can be used when an emergency condition arises.

For normal closing of the valve 13, there is provided a series of controls, comprising a push button switch 286, and a plurality of automatically operable auxiliary switches 287, 288 and 289.

Any number of auxiliary automatically operable switches, such as the switches 287, 288 and 289 may be employed. These switches are placed in parallel and are electrically connected with the auxiliary relay switch mechanism 153, as shown in Fig. 4.

A contact 290 of the push button switch 286 is connected to the positive main 103, by a wire 291. The other contact 292 is connected to the wire 163.

A contact 293 of the switch 287 is connected to the wire 291, by a wire 294. The terminal 295 of said switch 287 is connected to the wire 163, by a wire 296.

A contact 297 of the switch 288 is connected to the wire 294, by a wire 298, and the terminal 299 of said switch 288 is connected to the wire 296, by a wire 300.

A contact 301 of the switch 289 is connected to the wire 298, by a wire 302, and the terminal 303 of said switch 289 is connected to the wire 300, by a wire 304.

When either of the switches 286, 287, 288 or 289 are operated to close their respective contacts, the solenoid coil 161 of the auxiliary relay switch mechanism 153 will be energized from the positive main 103 through the wire 291, through either of the closed switches 286, 287, 288 or 289, to the wire 163, then through the wire 164, coil 161, and the wires 162 and 108, to the negative main 109.

When the solenoid coil 161 is thus energized, the switch mechanism 153 will be operated and the movable contacts 167 and 168 thereof will be disengaged from the pairs of fixed contacts 152, 169 and 170, 171, respectively. At the same time the movable contact 166 will engage the fixed contacts 172 and 173. Electric current from the positive main 103 will then be supplied to the coil 161, through the wire 151, contacts 144, 141 and 145, the wires 154 and 249, the contacts 172, 166 and 173, the wires 163 and 164, coil 161, and the wires 162 and 108, to the negative main 109. In this way the coil 161 remains energized after either of the switches 286, 287, 288 or 289 return to the open position shown in Fig. 4, until the switch device 137 is operated in the manner to be hereinafter more fully described to effect deenergization of the coil 161.

At the same time that the solenoid coil 161 is energized in the manner heretofore described, the solenoid coil 219 of the switch mechanism 220 (Fig. 3) will also be energized, through the electric circuit including the positive main 103, wire 291, either of the closed switches 286, 287, 288 or 289, the wires 163 and 227, the coil 219, the wire 211, switch 209, which now engages the fixed contact 215, the wires 216, 210 and 194, and the negative main 109.

When the solenoid coil 219 is thus energized the switch mechanism 220 will be operated and the movable contacts 221, 222, 223 and 224 thereof will engage their respective fixed contacts (see Fig. 3).

The motor 76 will then be supplied with electric energy through the electric circuit including the positive main 103, wire 237, contacts 235, 223 and 234, wire 236 to one terminal of the motor 76, and from another terminal of said motor, through the wires 196 and 232, contacts 230, 222 and 231, and the wire 233 to the negative main 109.

In this way the motor 76 is caused to operate in a reverse direction to the direction in which it is operated during the opening of the valve plug 14, and consequently the drum 74 will rotate in the direction opposite to the direction of the arrow, Fig. 2, thereby unwinding the cable 73.

As the tension of the cable 73 is thus slackened the outer free end of the lever 67 swings downwardly on the fulcrum provided by the pivots 68.

In the downward swinging movement of the lever 67, the plunger 36 of the pilot valve device 22 is moved downward an amount sufficient so that the heads 37 and 38 uncover the ports 45 and 50, respectively, thereby connecting the pressure chamber 40 with the chamber 49 of the control valve 21 through the passage 51, and at the same time connecting the control valve chamber 47 with the sump tank 59, through passage 48, chamber 39, passage 44, chamber 41, passage 63 and pipe 62.

Fluid under pressure from the supply tank 55 will thus be supplied to the chamber 49 on the underside of the piston 25. In this way the piston 25 will be forced upwardly and consequently the plunger 24 will move upwardly so that the heads 26 and 27 uncover the ports 31 and 34.

When the port 34 is uncovered, the piston chamber 33 will be connected to the sump tank 59, through pipe 35, chamber 54, passage 65 and pipe 62.

Fluid under pressure will, at the same time, be supplied to the piston chamber 30 from the pressure tank 55, through pipe 56, passage 58, chamber 53, port 31, and pipe 32.

The piston 19 is then actuated to operate the valve plug mechanism and effect rotation of the plug 14 from open towards closed position.

As the piston 19 (Fig. 1) moves towards the left the cam member 71 is pulled towards the left and, at the same time, the slack in the cable 73, due to the unwinding of the cable from the drum 74 by the motor 76, is taken up. Also the bar 120 is pulled towards the left to the position shown in Fig. 1.

Since the lever 67 functions as a floating lever, the fulcrum provided by the pivot 68 is not fixed, and this fulcrum moves upwardly when the control valve plunger 24 is moved upwardly in the manner above described. The tautness of the cable 73 during the movement of the piston 19 from right to left (Fig. 1) is such that the end of the lever 67 to which the pulley 78 is attached will gradually move downwardly so that the plunger 36 of the pilot valve 22 will be kept in the lowered position in which the ports 45 and 50 are uncovered by the heads 37 and 38, respectively, an amount to supply fluid under pressure to the chamber 49 so as to maintain the plunger 24 raised. In this way the supply of fluid under pressure to the piston chamber 30 will be controlled in such a manner that the valve plug 14 will not be rotated towards closed position any faster than the speed at which the motor 76 permits the operation to take place.

As the valve plug 14 turns towards closed position, the member 71 is pulled by the cable 70 towards the left. The relative position and contour of the cam surface 72 of the member 71 is such that during the initial operation of the control valve 21 the plunger 24 moves upwardly unrestrictedly an amount sufficient to permit as fast closing of the valve plug 14 as the motor 76 operates. However, during the final portion of the turning movement of the valve plug 14 towards closed position, the cam surface 72 engages the upper end of the plunger 24, thereby moving the piston heads 26 and 27 downwardly so as to partly lap the ports 31 and 34, respectively. This results in a gradual decrease in the speed or rate of closing movement of the valve plug, since the amount of fluid under pressure supplied to piston chamber 30 will be gradually reduced.

During the movement of the piston 19 from valve open towards valve closed position, the arm 77 is carried by the cable 73 away from engagement with the limit switch 204 and shifted towards the left so that when the valve plug 14 has been rotated to closed position, the arm 77 engages the depending end of the switch arm 208 and moves the limit switch 207 towards the left to the open position shown in Fig. 2. In this way the electric circuit of the motor 76 will be opened, so that no further operation of said motor takes place.

The relative positions of the plungers 24 and 36 of the control valve 21 and the pilot valve 22, respectively, will, at this stage of the operation of the apparatus be the same as shown in Fig. 2, and consequently with the ports 31, 34, 45 and 50 lapped, the fluid under pressure supplied to piston chamber 30 will be bottled up and the piston 19 will be retained in valve closed position.

When the valve plug 14 is fully closed and limit switch 207 opened in the manner above described, the circuit through which electric current is supplied to energize the solenoid coil 219 of the switch mechanism 220 will be opened, so that the solenoid of said switch mechanism will be deenergized. The movable contacts 221, 222, 223 and 224 will then move away from their respective fixed contacts to the position shown in Fig. 3, thereby opening the circuit through which electric current is supplied to the motor 76, so that said motor stops operating.

When the electric switch mechanism 220 is closed in the manner above described at the initiation of the normal valve closing operation, and movable contact 224 engages the fixed contacts 238 and 239, an electric circuit is closed whereby the solenoid coil 240 of the timing relay 241 is energized from the positive main 103, through wire 243, contacts 239, 224 and 238, wire 242, solenoid coil 240, and thence through wires 244 and 245 to the negative main 109 (see Figs. 1 and 3).

It will, therefore, be noted that bus A in the timing relay 241 is energized with positive electric current. The bus A is originally energized with electric current through the circuit including the contact 224 of the switch mechanism 220 and is held in place by its own contact 246 as long as the field switch 137 is energized.

When the solenoid coil 240 is thus energized, the movable contact 246 of the timing relay 241 is contacted with the fixed contacts 247 and 248, thereby closing an electric circuit through which the timing motor 252 is supplied with electric current from the positive main 103, through wire 151, contacts 144, 141 and 145 of the field switch 137, wires 154, 249, contacts 247, 246 and 248 of the timing relay 241, and wires 251 and 250 to one terminal of the electric motor 252, and thence from the other terminal of said motor through the wire 266, contacts 262, 258 and 261, and wires 265 and 245, to the negative main 109 (see Figs. 1, 3, 4 and 5).

The motor 252 operates the gear 255 so that the contacts 258 and 259 are moved, contact 258 being disengaged from the fixed contacts 261 and 262, and contact 259 being engaged with the fixed contacts 263 and 264.

The relation of the contact 258 with the contacts 261 and 262 and the contact 259 with the contacts 263 and 264 is such that during operation of the motor 252 in the above described manner, the movable contact 259 engages the contacts 263 and 264 just before the movable contact 258 is disengaged from the contacts 261 and 262.

As soon as the electric circuit of the motor 252 is opened by the movable contact 258 being moved away from the contacts 261 and 262, the motor will cease to operate.

However, when the movable contact 259 engages the contacts 263 and 264 an electric circuit is closed through which current is supplied from the positive bus A of the timing relay 241, through wires 250 and 269, contacts 264, 259 and 263, and wire 268, to one terminal of the tripping coil 267, and from the other terminal of coil 267 to the negative main 109 (see Fig. 3). In this way the solenoid coil 267 is energized so that movable contacts 271 and 272 are engaged with the fixed contacts 273, 156 and 272 and 274, respectively, of the tripping coil switch mechanism 157.

When the contact 271 of the tripping switch mechanism 157 engages the fixed contacts 156 and 273, an electric circuit is closed from the positive main 103, through wire 276, contacts 273, 271 and 156, wire 158, solenoid coil 146, and wires 155, 126, and 108, to the negative main 109.

When the contact 272 of the tripping switch mechanism 157 engages the fixed contacts 274 and 275, an electric circuit is closed from the positive main 103, through wires 276, 277, contacts 274, 272 and 275, wire 278, solenoid coil 102, and wires 126 and 108, to the negative main 109.

The solenoid coils 102 and 146 are thus energized so that the main switch mechanism 88 and the motor field switch mechanism 137 are both operated to open the respective motor circuits controlled thereby. In this way the operation of the pump motor 81 is halted, and the pump 11 ceases to function.

The opening of the motor field switch mechanism 137 in the manner above described, disengages the contact 141 from the contacts 144 and 145, so that the circuit through which electric current is supplied to the coil 240 of the timing relay 241 is opened. The solenoid of said coil then drops, with the result that contact 246 is disengaged from the contacts 247 and 248. This opens the circuit through which electric current is supplied to the timing motor 252, and consequently the operation of said motor is halted. Said motor is adapted to be automatically reset for another operation.

When the timing relay 241 is operated in the above described manner, the circuit through which electric current is supplied to solenoid coil 161 of the switch mechanism 153, so as to hold said coil energized as has been described, is opened, thereby deenergizing the coil 161 and permitting said switch mechanism to return to the position illustrated in Fig. 4, thereby placing the system in position for normal opening for the next operation.

Connected to one end of the solenoid coil 213 (Figs. 1 and 2) is a wire 311, which leads to as many controls as may be desired for the purpose of effecting a quick closing of the valve 13 and stopping of the pump 11, when an emergency condition arises in the system.

A contact 312 of the push button switch 313 is connected to the positive main 103. The other contact 314 of the switch 313 is connected to the wire 311.

In addition to the push button switch 313, there may be any number of automatically operable emergency switches, such as the switches 315, 316 and 317.

The switch 315 may be so constructed as to operate automatically under emergency overload conditions.

The switch 316 may be adapted to operate automatically under emergency conditions resulting from overheated bearings of the apparatus.

The switch 317 may be adapted to operate automatically when the voltage of the electric current supplied to the system decreases a predetermined amount.

Either of the switches 313, 315, 316 or 317 when closed, is adapted to close an electric circuit through which the solenoid coil 213 is energized from the positive main 103, through the wire 311, coil 213, wire 214, switch 208, which is closed when the valve plug 14 is in open position, wires 210 and 194, and the negative main 109.

When the solenoid coil 213 is thus energized, the member 69 is pulled downwardly by the solenoid of said coil. In this movement the lateral upper end of the member 69 engages the free end of the lever 67 and swings said lever downwardly about the fulcrum provided by pivot 68. Spring 78 is expanded somewhat by the downward swinging movement of lever 67.

A latch 307 engages the upper end of the member 69, when the lever 67 has thus been swung downwardly a predetermined amount, and retains the member 69 and said lever in lowered position.

The pilot valve 22 is operated by the lever 67 in the manner heretofore described so that the the control valve device 21 is actuated and the plunger 24 thereof raised to its maximum position, permitting fast operation of the valve plug 14 towards closed position.

As the valve plug 14 turns towards closed position, the member 71 is pulled by the cable 70 towards the left so that when the plug 14 is nearly closed the cam surface 72 of the member 71 engages the upper end of the plunger 24, thereby moving the piston heads 26 and 27 of the control valve downwardly so as to partly lap the ports 31 and 34, respectively. This results in a gradual decrease in the rate of closing movement of the valve plug for the last portion of the turning movement of the plug. In this way the plug is not jammed tight against its seat in the valve casing to cause injury to the parts of the mechanism.

When the valve plug 14 is fully closed the limit switch 207 will have been moved to its open position by the arm 77 in the manner heretofore described, thereby deenergizing the solenoid coil 213.

As shown in Fig. 4, additional switches 321, 322 and 323, may be connected to the several electrical circuits heretofore described, so as to provide auxiliary controls for the apparatus.

In a valve control mechanism embodying the present invention installed in the aqueduct between Parker Dam on the Colorado River and the city of Los Angeles, State of California, tests have been conducted to determine the actual time to effect closing of the valve plug under normal operating conditions of the mechanism as described above, and also under fast or emergency operating conditions. These tests have disclosed the fact that under normal conditions the valve operating mechanism is controlled so as to effect closing of the valve plug in approximately forty seconds, while during closing operation of the valve plug under emergency conditions obtained by energizing the solenoid coil 213, the average time to close the valve plug was approximately five seconds.

Having thus described my invention, what I claim is:

1. The combination with a fluid conduit having a main valve therein for opening and closing said conduit, power operated means for operating said valve, and electrical control mechanism for said power means responsive to fluid flow conditions in said conduit.

2. The combination with a fluid conduit having a main valve therein for opening and closing said conduit, power operated means for operating said valve, electrical control mechanism for said power means responsive to fluid flow conditions in said conduit, and a manually operable switch mechanism adapted to be operated to initiate operation of said electrical control mechanism.

3. The combination with a fluid conduit having a main valve therein for opening and closing said conduit, power operated means for operating said valve, an electric motor driven pump for pumping fluid through said conduit, and control mechanism for said power means and said pump responsive to fluid flow conditions in said conduit.

4. The combination with a fluid conduit having a main valve therein for opening and closing said conduit, power operated means for operating said valve, an electric motor driven pump for pumping fluid through said conduit, and electrically operable control mechanism responsive to fluid flow conditions in said conduit for said pump and said power means.

5. The combination with a fluid conduit having a main valve therein for opening and closing said conduit, power operated means for operating said valve, an electric motor driven pump for pumping fluid through said conduit, electrical switch means for controlling the operation of said pump, electrical switch means for controlling the operation of said power means, and means communicating the pressure in said conduit at the upstream side of said main valve to control the operation of electrical means adapted to interconnect said pump electrical switch means with said power electrical switch means.

6. The combination with a fluid conduit having a main valve therein for opening and closing said conduit and power operated means for operating said valve, of an electric motor driven pump for pumping fluid through said conduit, automatic control mechanism for said power means comprising a fluid pressure actuated member having a valve opening pressure chamber at one side thereof and a valve closing pressure chamber at the other side thereof, means for supplying fluid under pressure to said chambers, electrical control mechanism for said pressure supplying means, and means normally inactive when said pump is inactive and responsive to fluid flow conditions in said conduit at the upstream side of the main valve for controlling said electrical control mechanism.

7. The combination with a fluid conduit having a main valve therein for opening and closing said conduit and power operated means for operating said valve, of an electric motor driven pump for pumping fluid through said conduit, control mechanism for said power means comprising a fluid pressure actuated member having a valve opening pressure chamber at one side thereof and a valve closing pressure chamber at the other side thereof, means for supplying fluid under pressure to said chambers, electrical control mechanism for said fluid pressure supplying means, and means responsive to fluid flow conditions in said conduit at the upstream side of the main valve for controlling said electrical control mechanism, said fluid flow responsive means being active to flow in the conduit only when said pump is in operation.

8. The combination with a fluid conduit, an electric motor driven pump for pumping fluid through said conduit, a main valve in the conduit for opening and closing the conduit, means for operating said valve, control mechanism for said valve operating means, electrical means for said control mechanism, means responsive to fluid flow conditions in said conduit for controlling said electrical means, and means for interconnecting said electrical means with the pump motor.

9. The combination with a fluid conduit, an electric motor driven pump for pumping fluid through said conduit, a main valve in the conduit for opening and closing the conduit, means for operating said valve, control mechanism for said valve operating means, an electric motor therefor, mechanism to connect said motor to a source of supply, a relay responsive to interrupt said connection, said relay having an operating winding connected in circuit with said motor to effect response thereof under given current conditions, and means associated with said relay to prevent response thereof under given positions of said main valve.

10. The combination with a fluid conduit, an electric motor driven pump for pumping fluid through said conduit, a main valve in the conduit for opening and closing the conduit, means for operating said valve, control mechanism for said valve operating means, means associated with said control mechanism and adapted to be driven into a definite limit, an electric motor for driving said associated means, a line switch mechanism for connecting said motor to a source of supply and having electromagnetically operated means associated therewith for holding the same in closed position, a relay responsive to render the holding means ineffective under given current conditions in the motor circuit, and means associated with said relay to control operation thereof under predetermined positions of said valve during movement thereof.

11. The combination comprising a conduit having a movable valve element therein for controlling fluid flow through the conduit, mechanism for operating said valve element, an electric motor driven hydraulic pump for pumping fluid through said conduit, means for controlling the current supply to said pump motor, and means operative when said pump motor is active for controlling the operation of said valve operating mechanism.

12. The combination comprising a conduit having a movable valve element therein for controlling fluid flow through the conduit, mechanism for operating said valve element, an electric motor driven hydraulic pump for pumping fluid through said conduit, means for controlling the current supply to said pump motor for initiating operation of said pump motor when said valve element is in closed position, means operative only when said pump motor is operating for controlling the operation of said valve operating mechanism to effect movement of said valve element from closed towards open position, means for controlling the operation of said valve operating mechanism to effect movement of said valve element from open towards closed position, and means operative at the conclusion of the valve closing movement for opening the electric circuit through which current is supplied to said pump motor.

13. The combination comprising a conduit having a movable valve element therein for controlling fluid flow through the conduit, mechanism for operating said valve element, an electric motor driven hydraulic pump for pumping fluid through said conduit, means for controlling the current supply to said pump motor for initiating operation of said pump motor when said valve element is in closed position, and means operative only when said pump motor is operating for controlling the operation of said valve operating mechanism.

14. The combination comprising a conduit having a movable valve element therein for controlling fluid flow through the conduit, mechanism for operating said valve element, an electric motor driven hydraulic pump for pumping fluid through said conduit, means for controlling the current supply to said pump motor for initiating operation of said pump motor when said valve element is in closed position, means operative only when said pump motor is operating for controlling the operation of said valve operating mechanism, and means operatively connected to the valve operating mechanism for preventing closing of the electric circuit through which current is supplied to said pump motor.

15. The combination comprising a conduit having a movable valve element therein for controlling fluid flow through the conduit, mechanism for operating said valve element, an electric motor driven hydraulic pump for pumping fluid through said conduit, means for controlling the current supply to said pump motor for initiating operation of said pump motor when said valve element is in closed position, means operative only when said pump motor is operating for controlling the operation of said valve operating mechanism, and a manually operable electric switch operatively connected to the valve operating mechanism for also controlling the electric circuit through which current is supplied to said pump motor.

16. The combination comprising a conduit having a movable valve element therein for controlling fluid flow through the conduit, mechanism for operating said valve element, an electric motor driven hydraulic pump for pumping fluid through said conduit, means for controlling the current supply to said pump motor, means for controlling the operation of said valve operating mechanism, a manually operable electric switch for also controlling the current supply to said pump motor, and means operatively connected to the valve operating mechanism for preventing operation of said manually operable electric switch when said valve element is in open position.

17. The combination comprising a conduit having a movable valve element therein for controlling fluid flow through the conduit, mechanism for operating said valve element, an electric motor driven hydraulic pump for pumping fluid through said conduit, means for controlling the current supply to said pump motor, means for controlling the operation of said valve operating mechanism, a manually operable electric switch operable only when said valve element is in closed position for also controlling the current supply to said pump motor, and means operatively connected to the valve operating mechanism for rendering said manually operable electric switch inoperative when said valve element is in open position.

18. The combination comprising a conduit having a movable valve element therein for controlling fluid flow through the conduit, mechanism for operating said valve element, an electric motor driven hydraulic pump for pumping fluid through said conduit, and means operable by the pressure of fluid in said conduit between the pump and said valve element for controlling operation of said valve operating mechanism.

19. The combination comprising a conduit having a movable valve element therein for controlling fluid flow through the conduit, mechanism for operating said valve element, an electric motor driven hydraulic pump for pumping fluid through said conduit, electrically operated means for controlling the operation of said valve operating mechanism, and an electrical switch mechanism operable by the pressure of fluid in said conduit between the pump and said valve element for controlling the operation of said electrically operated means.

20. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, a floating lever controlling the operation of said fluid pressure controlling means, and means operatively connecting said floating lever with said abutment.

21. The combination in a valve mechanism comprising a valve casing, a movable valve element disposed in said casing and adapted to control fluid flow therethrough, actuating means for moving said valve element in opposite directions including a fluid pressure operated abutment, a source of fluid under pressure, means for controlling fluid flow from said source to said abutment, a floating lever controlling the operation of said controlling means, and means operated by said abutment for actuating said floating lever.

22. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, a floating lever controlling the operation of said fluid pressure controlling means, a reversible electric motor, a drum operated by said motor, a cable connecting said abutment with said drum, a cam operated by said cable for actuating said floating lever, resilient means also connecting said floating lever with said cable and disposed in spaced relation to said cam, and means for controlling the operation of said electric motor.

23. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, a floating lever controlling the operation of said fluid pressure controlling means, a reversible electric motor, a drum operated by said motor, a cable connecting said abutment with said drum, means operatively connecting the cable with said floating lever, means for controlling the operation of said electric motor, and means operable independent with respect to said motor for actuating said floating lever.

24. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, a floating lever controlling the operation of said fluid pressure controlling means, a reversible electric motor, a drum operated by said motor, a cable connecting said abutment with said drum, means operatively connecting the cable with said floating lever, means for controlling the operation of said electric motor, and means carried by the cable for limiting the operation of said electric motor.

25. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, means for controlling the operation of said fluid pressure controlling means, an electric motor, means operatively connecting said motor with said abutment, and means for simultaneously controlling the operation of said controlling means and said motor.

26. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment including a valve having a piston and a stem extending from the piston and a pilot valve for controlling fluid pressure to actuate said piston, a floating lever operatively connected to said piston stem and to said pilot valve, means for actuating said floating lever to effect actuation of said pilot valve, and means operatively connected with said abutment for actuating said piston stem to effect operation of said floating lever.

27. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment including a control valve having a piston and a stem extending from the piston and a pilot valve for controlling fluid pressure to actuate said piston, a floating lever operatively connected to said piston stem and to said pilot valve, and means for actuating said floating lever.

28. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, means for controlling the operation of said fluid pressure controlling means and including an electric motor operatively connected with said abutment, and means for controlling the operation of said motor.

29. The combination in a valve mechanism comprising a valve casing, a movable valve element disposed in said casing and adapted to control fluid flow therethrough, actuating means for moving said valve element in opposite directions including a fluid pressure operated abutment, means for controlling fluid pressure to effect operation of said abutment, and a floating lever for controlling the operation of said fluid pressure controlling means.

30. A valve mechanism for a conduit comprising a casing and a movable valve element disposed therein adapted to control fluid flow therethrough, means for actuating said valve element including opening and closing fluid pressure chambers, a source of fluid under pressure, means for controlling fluid flow from the source of fluid under pressure to said chambers including a control valve and a pilot valve, a floating lever operatively connected to the control valve and to the pilot valve, and electrically controlled means for actuating said floating lever.

31. A valve mechanism for a conduit comprising a casing and a movable valve element disposed therein adapted to control fluid flow therethrough, means for actuating said valve element including opening and closing fluid pressure chambers, means for controlling fluid flow relative to said chambers including a fluid passage having a control valve disposed therein, means for operating said control valve, a floating lever operatively connected to said control valve and to said control valve operating means, and electrically controlled means for actuating said floating lever.

32. A valve mechanism for a conduit comprising a casing and a movable valve element disposed therein adapted to control fluid flow therethrough, means for actuating said valve element including opening and closing fluid pressure chambers, means for controlling fluid flow relative to said chambers including a fluid passage having a control valve disposed therein, fluid pressure means for operating said control valve, means for controlling fluid flow relative to said fluid pressure means, a floating lever operatively connected to said control valve and to said fluid pressure means, and means for actuating said floating lever.

33. The combination comprising a conduit having a movable valve element therein for controlling fluid flow through the conduit, mechanism for operating said valve element, an electric motor driven hydraulic pump for pumping fluid through said conduit, electromagnetically operated means for controlling the current supply to said pump motor, and a relay switch mechanism operative when said pump motor is active for controlling the operation of said valve operating mechanism.

34. The combination comprising a conduit having a movable valve element therein for controlling fluid flow through the conduit, mechanism for operating said valve element, an electric motor driven hydraulic pump for pumping fluid through said conduit, electromagnetically operated means for controlling the current supply to said pump motor for initiating operation of said pump motor when said valve element is in closed position, relay switch mechanism operative only when said pump motor is operating for controlling the operation of said valve operating mechanism to effect movement of said valve element from closed towards open position, electric circuit controlling means for controlling the operation of said valve operating mechanism to effect movement of said valve element from open towards closed position, and means operative at the conclusion of the valve closing movement for operating the electromagnetically operated means of said pump motor control.

35. The combination comprising a conduit having a movable valve element therein for controlling fluid flow through the conduit, mechanism for operating said valve element, an electric motor driven hydraulic pump for pumping fluid through said conduit, electromagnetically operated means for controlling the current supply to said pump motor for initiating operation of said pump motor when said valve element is in closed position, relay switch mechanism operative only when said pump motor is operating for controlling the operation of said valve operating mechanism, and means operatively connected to the valve operating mechanism for controlling the electric circuit through which current is supplied to said pump motor.

36. The combination comprising a conduit having a movable valve element therein for controlling fluid flow through the conduit, mechanism for operating said valve element, an electric motor driven pump for pumping fluid through said conduit, electromagnetically operated means for controlling the current supply to said pump motor for initiating operation of said pump motor, means for preventing initial operation of said electromagnetic means except when said valve element is in closed position, electric relay mechanism operative only when said pump motor is active for controlling the operation of said valve operating mechanism, and a manually operable electric switch operatively connected in a circuit of the valve operating mechanism control means to effect operation of said relay mechanism so as to initiate operation of the valve element towards closed position irrespective of conditions in the current supply of said pump motor.

37. The combination comprising a conduit having a movable valve element therein for controlling fluid flow through the conduit, mechanism for operating said valve element, an electric motor driven pump for pumping fluid through said conduit, a set of contacts, means for effecting the operation of said contacts when said valve element is in closed position for effecting operation of said pump during the starting of the apparatus, and means for effecting operation of said valve element to establish communication through the conduit when the pressure of the fluid in the conduit between the pump and said valve element has been built up to a predetermined amount.

38. The combination comprising a conduit having a movable valve element therein for controlling fluid flow through the conduit, mechanism for operating said valve element, an electric motor driven pump for pumping fluid through said conduit, electrical contacts, means for effecting the operation of said contacts when said pump motor is operating for effecting the operation of said valve element from open to closed position, and means controlled by the position of said valve operating mechanism for actuating said contacts to render said valve operating mechanism and said pump motor inoperative.

39. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit.

40. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit so as to effect operation of the valve mechanism subsequent to the initiation of operation of the pump motor.

41. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit so as to effect operation of the valve mechanism subsequent to the initiation of operation of the pump motor when the valve element is in closed position to establish communication through the conduit after the pressure of the fluid in the conduit between the pump and the valve has been built up to a predetermined amount.

42. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit so as to effect operation of the valve mechanism subsequent to the initiation of operation of the pump motor when the valve element is in closed position to establish communication through the conduit after the pressure of the fluid in the conduit between the pump and the valve has been built up to a predetermined amount and to effect operation of the valve mechanism to effect closing of the valve irrespective of operating conditions of said pump motor.

43. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit so as to effect operation of the valve mechanism subsequent to the initiation of operation of the pump motor when the valve element is in closed position to establish communication through the conduit after the pressure of the fluid in the conduit between the pump and the valve has been built up to a predetermined amount and to effect operation of the valve mechanism to effect closing of the valve irrespective of operating conditions of said pump motor, said means being effective to open the pump motor circuit when the valve has moved to closed position.

44. The combination comprising a conduit having a movable valve element therein for controlling fluid flow through the conduit, mechanism for operating said valve element, an electric circuit for controlling the operation of said mechanism, an electric motor driven pump for pumping fluid through said conduit, an electric circuit for said pump motor, and means for interconnecting said valve mechanism circuit with said pump motor circuit so as to effect operation of the valve mechanism subsequent to the initiation of operation of the pump motor when the valve element is in closed position to establish communication through the conduit after the pressure of the fluid in the conduit between the pump and the valve has been built up to a predetermined amount and to effect rapid operation of the valve mechanism to effect closing of the valve irrespective of operating conditions of said pump motor.

EUGENE C. BRISBANE.